US011176464B1

(12) United States Patent
Sagi et al.

(10) Patent No.: US 11,176,464 B1
(45) Date of Patent: Nov. 16, 2021

(54) MACHINE LEARNING-BASED RECOMMENDATION SYSTEM FOR ROOT CAUSE ANALYSIS OF SERVICE ISSUES

(71) Applicant: EMC IP Holding Company LLC, Hopkinton, MA (US)

(72) Inventors: Omer Sagi, Mazkeret Batya (IL); Nimrod Milo, Gedera (IL); Haim Halbfinger, Raanana (IL); Ronen Halsadi, Yehud (IL); Gilad Braunschvig, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 1084 days.

(21) Appl. No.: 15/496,514

(22) Filed: Apr. 25, 2017

(51) Int. Cl.
| | | |
|---|---|---|
| *G06N 5/04* | (2006.01) | |
| *G06N 7/00* | (2006.01) | |
| *G06N 20/00* | (2019.01) | |
| *G06F 11/07* | (2006.01) | |
| *G06Q 30/00* | (2012.01) | |

(52) U.S. Cl.
CPC ............ *G06N 5/04* (2013.01); *G06F 11/079* (2013.01); *G06N 7/005* (2013.01); *G06N 20/00* (2019.01); *G06Q 30/016* (2013.01)

(58) Field of Classification Search
None
See application file for complete search history.

(56) References Cited

U.S. PATENT DOCUMENTS

| | | |
|---|---|---|
| 5,463,768 A | 10/1995 | Cuddihy |
| 7,765,212 B2 | 7/2010 | Surendran et al. |
| 7,900,201 B1 * | 3/2011 | Qureshi .................. G06N 5/048 717/174 |
| 7,912,847 B2 | 3/2011 | Lagad et al. |
| 8,396,741 B2 | 3/2013 | Kannan et al. |

(Continued)

OTHER PUBLICATIONS

Abbaszadeh Jr, Zahra. Supervised fault detection using unstructured server-log data to support root cause analysis. MS thesis. 2014. (Year: 2014).*

(Continued)

*Primary Examiner* — Daniel T Pellett
(74) *Attorney, Agent, or Firm* — Ryan, Mason & Lewis, LLP

(57) ABSTRACT

A machine learning-based recommendation system is provided for root cause analysis of service issues. An illustrative method of a machine learning system comprises extracting features from service issue investigation log sets corresponding to previously considered service issues; generating representations for the service issue investigation log sets based on the corresponding extracted features; and storing the representations in a knowledge base. In conjunction with obtaining an additional service issue investigation log set, the illustrative method generates a representation of the additional service issue investigation log set; identifies representations previously stored in the knowledge base as candidate service issues related to the additional service issue based on pairwise probabilities indicating whether the additional service issue is related to at least a subset of the previously considered service issues; and presents information characterizing the service issue investigation log sets corresponding to respective ones of the identified representations.

20 Claims, 6 Drawing Sheets

(56) References Cited

U.S. PATENT DOCUMENTS

| | | |
|---|---|---|
| 8,458,115 B2 | 6/2013 | Cai et al. |
| 8,645,395 B2 | 2/2014 | Mushtaq et al. |
| 8,719,302 B2 | 5/2014 | Bailey et al. |
| 8,738,361 B2 | 5/2014 | Gryc et al. |
| 10,685,292 B1 | 6/2020 | Milo et al. |
| 2002/0100023 A1 | 7/2002 | Ueki et al. |
| 2002/0123987 A1 | 9/2002 | Cox et al. |
| 2002/0152208 A1 | 10/2002 | Bloedorn et al. |
| 2003/0088562 A1 | 5/2003 | Dillon |
| 2008/0244325 A1 | 10/2008 | Tyulenev et al. |
| 2009/0043797 A1 | 9/2009 | Dorie et al. |
| 2011/0136542 A1 | 6/2011 | Sathish |
| 2013/0097167 A1 | 4/2013 | St. Jacques, Jr. et al. |
| 2013/0211880 A1 | 8/2013 | Kannan et al. |
| 2014/0101086 A1 | 4/2014 | Lu et al. |
| 2014/0129536 A1* | 5/2014 | Anand .............. G06N 7/005 707/706 |
| 2015/0178634 A1 | 6/2015 | Chen et al. |
| 2015/0347212 A1 | 12/2015 | Bartley et al. |
| 2015/0347264 A1 | 12/2015 | Mohammed et al. |
| 2016/0104093 A1 | 4/2016 | Fletcher et al. |
| 2016/0110238 A1 | 4/2016 | Burugula et al. |
| 2016/0292065 A1 | 10/2016 | Thanagamani et al. |
| 2017/0017537 A1* | 1/2017 | Razin .............. G06N 20/00 |
| 2017/0212756 A1 | 7/2017 | Ryali et al. |
| 2017/0300532 A1 | 10/2017 | Simhon et al. |
| 2017/0331673 A1* | 11/2017 | Iyer ................ G06N 20/00 |

OTHER PUBLICATIONS

Abele, Lisa, et al. "Combining knowledge modeling and machine learning for alarm root cause analysis." IFAC Proceedings vols. 46.9 (2013): 1843-1848. (Year: 2013).*

Salton et al., "A Vector Space Model for Automatic Indexing", Communications of the ACM, vol. 18, Issue 11 (1975).

Chuang et al., "Termite Visualization Techniques for Assessing Texual Topic Models," Proceedings of the ACM International Working Conference on Advanced Visual Interfaces (AVI), pp. 74-77,Capri Island, Naples, Italy, May 2012.

Cohen, et al., "Redundancy in Electronic Health Record Corpora: Analysis, Impact on Text Mining Performance and Mitigation Strategies," BMC Bioinformatics, pp. 1-15, vol. 14, No. 10, Apr. 2013.

R. Cohen, "Towards Understanding of Medical Hebrew," Thesis, Ben-Gurion University of the Negev, 127 pages, Nov. 2012.

D.M. Blei et al., "Latent Dirichlet Allocation," Journal of Machine Learning Research, pp. 993-1022, Jan. 2003.

A.K. Mccallum, "Mallet: A Machine Learning for Language Toolkit," 2 pages, (2002).

H.M. Wallach et al., "Rethinking LDA: Why Priors Matter," Advances in Neural Information Processing Systems 22:23rd Annual Conference on Neural Information Processing Systems, 9 pages, Vanvouver, British Columbia, Canada, Dec. 2009.

P.F. Brown et al., "Class-Based n-gram Models of Natural Language," Association for Computation Linguistics, pp. 467-479, vol. 18, No. 4 (1992).

Banerjee et al., "The Design, Implementation and Use of the Ngram Statistics Package," Proceedings of the 4th International Conference on Computational Linguistics and Intelligent Text Processing (CICLing), pp.I 370-381 (2003).

Nenkova et al., "The Impact of Frequency on Summarization," Microsoft Research, Tech. Rep. MSR-TR-2005-101, 8 pages, Jan. 2005.

Daume III et al., "Bayesian Query-Focused Summarization," Proceedings of the 21st International Conference on Computational Linguistics and 44th Annual Meeting of the ACL, pp. 305-312, Sydney, Australia, Jul. 2006.

Conroy et al., "CLASSY Query-Based Multi-Document Summarization," Proceedings of the 2005 Document Understanding Workshop, 9 pages, Oct. 2005.

Baumel et al., "Query-Chain Focused Summarization," Proceedings of the 52nd Annual Meeting of the Association for Computational Linguistics, pp. 913-922, vol. 22, Dec. 2004.

G. Erkan et al., "LexRank: Graph-Based Lexical Centrality as Salience in Text Summarization," Journal of Artificial Intelligence Research, Dec. 2004, pp. 457-479, vol. 22.

U.S. Appl. No. 14/501,407 filed in the name of R. Cohen et al. on Sep. 30, 2014 and entitled "Automated Content Inference System for Unstructured Text Data."

U.S. Appl. No. 14/501,431 filed in the name of R. Cohen et al. on Sep. 30, 2014 and entitled "Cluster Labeling System for Documents Comprising Unstructured Text Data."

U.S. Appl. No. 14/670,810 filed in the name of R. Cohen et al. on Mar. 27, 2015 and entitled "Analysis and Visualization Tool with Combined Processing of Structured and Unstructured Service Event Data."

U.S. Appl. No. 14/850,195 filed in the name of R. Cohen et al. on Sep. 10, 2015 and entitled "Topic Model Based Clustering of Text Data with Machine Learning Utilizing Interface Feedback."

* cited by examiner

FIG. 5

Query

ENTER ISSUE SFDC NUMBER

[ 9791 ] [Search]

Results

| ID | DISTANCE | BUILDSTRING | SUMMARY | FEEDBACK |
|---|---|---|---|---|
| XIO-32438 | 0.203 | 4.0.15-4.0... | STATE SEEING HIGH LATENCY ndu TO 4.0.15-4 | 👍/👎 |
| XIO-32438 | 0.203 | 4.0.15-4.0... | STATE - CORP - PI - VBLOCK\|\|OBSERVED HIGH LATENCY DURING CODE UPGRADE | 👍/👎 |
| XIO-31507 | 0.244 | 4.0.15-4.0... | oce: du WITH AUTO RECOVERY AFTER x1-sc1 FALLOVER DURING CLUSTER EXPANSION, AT MOVING_DATA STAGE | 👍/👎 |
| XF-2983 | 0.250 | 4.0.15-15.0... | RC FOR UPGRADE FAILURE | 👍/👎 |
| XIO-31477 | 0.257 | 4.0.15-4.0... | ce STATE MOVING JOURNALS TAKE TOO LONG, psu OF ONE OF NEW sc NOT WORKING PROPERLY | 👍/👎 |

[Show More]  JOB ID: 1612291227324408x5AK

JIRA LINKS

JIRA/SF TITLE

500

MACHINE LEARNING-BASED RECOMMENDATION SYSTEM FOR ROOT CAUSE ANALYSIS OF SERVICE ISSUES

CROSS-REFERENCE TO RELATED APPLICATION

The present application is related to U.S. patent application Ser. No. 15/168,642, filed May 31, 2016, (issued as U.S. Pat. No. 10,685,292 on Jun. 16, 2020), entitled "Similarity-Based Retrieval of Software Investigation Log Sets for Accelerated Software Deployment," incorporated by reference herein.

FIELD

The field relates generally to information processing systems, and more particularly to root cause analysis of service issues in information processing systems.

BACKGROUND

Fast and effective customer support is important for customer satisfaction and loyalty in the Information Systems industry. When a customer reports a field issue (such as system bugs, power outage and/or data unavailability), the vendor or service provider is required to solve the reported issue and to provide a root cause analysis of its occurrence. Providing a root cause analysis typically requires the expensive time of experienced engineers who investigate the issue by joining information from different sources (such as log events, configuration files and/or customer free text). Some of these investigations can last hours, or even days, in the case of an unfamiliar or complex issue.

Service issue tracking systems (such as JIRA Software™ or Bugzilla™) typically enable a textual query to locate items of interest (e.g., log content, system documentation, configuration properties and/or labels) as a part of investigating an issue. These search tools, however, assume the presence of high quality data and that user descriptions are semantically accurate. In reality, these conditions are often not met and the investigation becomes a frustrating and time consuming task.

A need exists for improved techniques for recommending related issues for root cause analysis.

SUMMARY

Illustrative embodiments of the present disclosure provide a machine learning-based recommendation system for root cause analysis of service issues. In one embodiment, an apparatus comprises a processing platform configured to implement a machine learning system for automated probability-based retrieval of service issue investigation log sets; wherein the machine learning system comprises: a log set preprocessor configured to extract features from each of the service issue investigation log sets corresponding to previously considered service issues and to generate representations for respective ones of the service issue investigation log sets based at least in part on the corresponding extracted features; a knowledge base configured to store the representations; and a probability-based log set retrieval module.

In one or more embodiments, the probability-based log set retrieval module is configured to perform the following steps in conjunction with obtaining at least one additional service issue investigation log set requiring investigation to determine one or more root causes of the corresponding at least one additional service issue: obtaining a representation of the additional service issue investigation log set; identifying, using at least one processing device of the machine learning system, one or more of the representations previously stored in the knowledge base as candidate service issues that are related to the at least one additional service issue based on pairwise probabilities indicating whether the at least one additional service issue is related to at least a subset of the previously considered service issues; and presenting information characterizing the one or more service issue investigation log sets corresponding to respective ones of the identified one or more representations in a user interface.

These and other illustrative embodiments described herein include, without limitation, apparatus, systems, methods and computer program products comprising processor-readable storage media.

BRIEF DESCRIPTION OF THE DRAWINGS

FIG. 5 illustrates an exemplary user interface for presenting a top N list of related service issues, according to one embodiment of the disclosure.

DETAILED DESCRIPTION

Illustrative embodiments of the present disclosure will be described herein with reference to exemplary information processing systems and associated processing devices. It is to be appreciated, however, that embodiments of the disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources.

Figure 1:
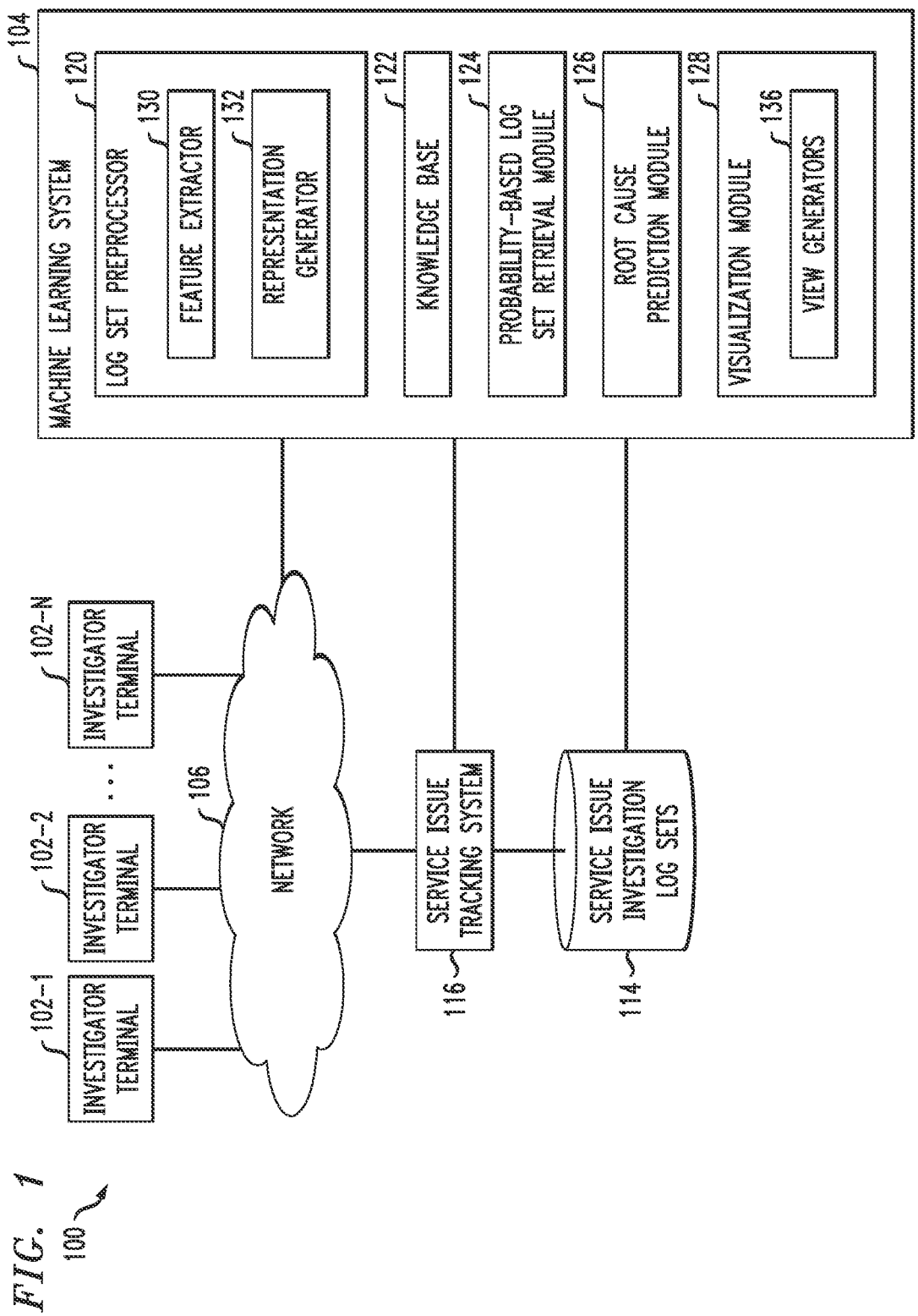
FIG. 1 is a block diagram of a machine learning-based recommendation system for root cause analysis of service issues, according to one embodiment of the invention.

FIG. 1 shows an information processing system 100 configured in accordance with an illustrative embodiment of the present disclosure. The exemplary information processing system 100 is configured in at least one embodiment of the invention to generate machine learning-based recommendations for root cause analysis of service issues. The information processing system 100 is assumed to be built on at least one processing platform and in this embodiment illustratively comprises a plurality of investigator terminals 102-1, 102-2, . . . 102-N and a machine learning system 104, all of which are coupled to, and communicate over, a network 106. The machine learning system 104 is advantageously configured for automated recommendation of related service issues for root cause analysis from service issue investigation log sets. The service issue investigation log sets illustratively comprise information characterizing respective investigations of service issues as carried out by one or more service investigators (e.g., engineers) associated with investigator terminals 102. These service investigators illustratively comprise engineers, analysts, subject matter experts or other system users that are involved in investigations of service issues.

The machine learning system 104 is coupled to a service issue investigation log sets database 114. The log sets database 114 in the present embodiment is assumed to comprise service issue investigation log sets generated by a service issue tracking system 116, although other types of service issue investigation log sets can be used in other embodiments. The term "service issue investigation log set" as used herein is intended to be broadly construed so as to encompass, for example, logs of events associated with investigation of service issues, such as system bugs, power outage and/or data unavailability, or other issues arising in conjunction with a service provided to a customer. A given such service issue investigation log set in an illustrative embodiment may be viewed as comprising a "dossier" of information characterizing a service issue investigation conducted by a technician, engineer or other type of system user within the system 100.

It is to be appreciated that the log sets database 114 may comprise a combination of multiple separate databases, such as separate databases for storing log sets for different types of service issues or for different customers. Such multiple databases may be co-located within a given data center or other facility or geographically distributed over multiple distinct facilities. Numerous other combinations of multiple databases can be used in implementing at least portions of the log sets database 114. For example, a given information processing system in another embodiment can include multiple service issue tracking systems 116, each having its own database of service issue investigation log sets.

The log sets database 114 illustratively comprises one or more storage disks, storage arrays, electronic memories or other types of memory, in any combination. Although shown as separate from the machine learning system 104 in FIG. 1, the log sets database 114 in other embodiments can be at least partially incorporated within the machine learning system 104, or within one or more other system components.

The log sets stored in the log sets database 114 need not be in any particular format or formats, but generally comprise data logs characterizing investigations undertaken by one or more technicians or engineers relating to service issues arising with customers.

In the present embodiment, the machine learning system 104 and the log sets database 114 are both assumed to be associated with the service issue tracking system 116. For example, the storage of logs sets in, and the retrieval of logs sets from, the log sets database 114 in this embodiment can be controlled at least in part by the associated service issue tracking system 116. The machine learning system 104 can communicate directly with the log sets database 114 and the service issue tracking system 116, and additionally or alternatively can communicate with these and other system components via the network 106.

It is assumed in the present embodiment that the service issue tracking system 116 coordinates storage of service issue investigation log sets in the log sets database 114, as well as provisioning of portions of those log sets to the machine learning system 104 as needed for processing. It is also possible for the machine learning system 104 to provide data directly to, and retrieve data directly from, the log sets database 114. Examples of conventional service issue tracking systems that may be adapted for use in illustrative embodiments of the present disclosure include JIRA™, Gitlab™ and Bugzilla™.

At least portions of the data provided for storage in the log sets database 114 can come from one or more of the investigator terminals 102 via the service issue tracking system 116. Also, visualizations or other related output information can be delivered by the machine learning system 104 to one or more of the investigator terminals 102 over network 106. Thus, for example, a visualization or other type of machine learning system output can be provided to an application running on a desktop computer, tablet computer, laptop computer, mobile telephone or other type of investigator terminal.

The machine learning system 104 in the present embodiment is separated into a plurality of functional modules, illustratively including a log set preprocessor 120, a knowledge base 122, a probability-based log set retrieval module 124, a root cause prediction module 126 and a visualization module 128.

The log set preprocessor 120 is configured to extract features from each of a plurality of service issue investigation log sets and to generate representations for respective ones of the service issue investigation log sets based at least in part on the corresponding extracted features, as discussed further below in conjunction with FIG. 3. These functions are illustratively provided by a feature extractor 130 and a representation generator 132, respectively.

It is assumed that at least a subset of the service issue investigation log sets processed by the log set preprocessor 120 are generated by the service issue tracking system 116, although the machine learning system 104 can obtain log sets in other ways in one or more alternative embodiments of the disclosure. Also, it should be noted that in some embodiments, at least a portion of the machine learning system 104 may be implemented within the service issue tracking system 116, or vice-versa. The machine learning system 104 and the service issue tracking system 116 therefore need not be entirely separate elements as illustrated in the FIG. 1 embodiment.

In some embodiments, at least a given one of the service issue investigation log sets comprises serial log instances relating to at least one root cause analysis performed for a service issue of a customer. Such root cause analysis may be performed by the service issue tracking system 116 under the control of a software technician associated with one of the investigator terminals 102. As another example, a given one of the service issue investigation log sets may comprise a set of log files relating to a plurality of different events involving a particular service issue. The events can be from different parts of a system in which the service issue occurred, such as from different nodes in a cluster-based system. It is also possible that a given log set can comprise a set of log files obtained from "call home" log data submitted to the system 100 by a given customer with respect to a particular service issue. Accordingly, it should be apparent that a wide variety of different types of log sets can be used in illustrative embodiments.

The log set preprocessor 120 in the present embodiment is assumed to generate the representation of a given one of the service issue investigation log sets as a vector representation having entries corresponding to respective ones of the extracted features, as discussed further below in conjunction with FIG. 3. Accordingly, particular features extracted by the feature extractor 130 are inserted into corresponding entry positions in a vector representation generated by the representation generator 132. The resulting representation may be viewed as providing a "fingerprint" for the corresponding log set.

The machine learning system 104 is advantageously data driven in that representations are generated automatically utilizing features extracted from the service issue investigation log sets themselves using the log set preprocessor 120. Such an arrangement allows relationships with other log sets to be determined in a particularly accurate and efficient manner.

The log set preprocessor 120, in generating the representation of a given one of the service issue investigation log sets, is illustratively further configured to augment the representation utilizing metadata obtained from the service issue tracking system 116. Such metadata in some embodiments comprises root cause information of the corresponding log set.

Although the log set preprocessor 120 in the FIG. 1 embodiment is shown as being implemented within the machine learning system 104, in other embodiments, the log set preprocessor 120 can be implemented at least in part externally to the machine learning system 104. For example, log set preprocessor 120 can be implemented in a related system, such as the service issue tracking system 116.

The knowledge base 122 is configured to store the log set representations generated by the log set preprocessor 120. The knowledge base 122 in some embodiments is implemented using an electronic memory or other high-speed memory of the machine learning system 104 or an associated processing platform.

The probability-based log set retrieval module 124 is configured to implement at least portions of a machine learning-based recommendation process, as discussed further below in conjunction with FIG. 2, to retrieve, for a given additional log set obtained by the machine learning system 104, one or more previously processed log sets that exhibit characteristics related to that of the given additional log set. The additional log set may be submitted via the service issue tracking system 116 by a system user such as a technician associated with one of the investigator terminals 102.

By way of example, in conjunction with obtaining at least one additional service issue investigation log set, the machine learning system 104 is configured to generate a representation of the additional service issue investigation log set using the log set preprocessor 120, and to identify one or more of the representations previously stored in the knowledge base 122 that are determined by the probability-based log set retrieval module 124 to exhibit at least a specified relationship with the representation of the additional service issue investigation log set.

The term "probability-based log set retrieval" as used herein is intended to be broadly construed so as to encompass retrieval of log set representations from the knowledge base 122, and additionally or alternatively retrieval of the actual log sets from the log sets database 114 or other storage system.

The machine learning system 104 in the present embodiment further comprises a root cause prediction module 126. This module is illustratively configured to determine a root cause for the at least one additional service issue investigation log set based at least in part on root cause information associated with respective ones of the one or more of the representations previously stored in the knowledge base 122 that exhibit at least the specified relationship to the representation of the additional service issue investigation log set. For example, the root cause prediction module 126 can estimate a root cause for the additional service issue investigation log set as an average or other function of root cause values that were previously specified for the other log sets determined to be sufficiently related to the additional log set.

The machine learning system 104 stores the representation of the additional service issue investigation log set in the knowledge base 122 for use in processing other service issue investigation log sets subsequently obtained by the machine learning system 104. As the knowledge base 122 in the present embodiment stores representations rather than the actual log sets, it can operate quickly on any submitted log sets by comparing representations of those log sets to previously stored representations of other log sets. The actual log sets corresponding to a given identified representation can be retrieved by the machine learning system 104 as needed and provided to one or more of the investigator terminals 102 over the network 106, possibly via the service issue tracking system 116.

The visualization module 128 comprises one or more view generators 136. Information characterizing the one or more service issue investigation log sets corresponding to respective ones of the identified one or more representations is presented in a user interface under control of the one or more view generators 136 of the visualization module 128.

In some embodiments, the machine learning system 104 is configured to receive user feedback regarding at least one of the identified one or more representations via the user interface and to optionally adjust one or more models within the machine learning system 104 responsive to the received user feedback. For example, the probability-based log set retrieval module 124 in some embodiments is configured to receive feedback from one of the service investigators or another system user regarding relationships among the one or more identified representations or their respective log sets and the additional log set.

Visualizations generated by the one or more view generators 136 of the visualization module 128 are presented to a system user possibly in conjunction with the one or more user interface displays. For example, a given one of the view generators 136 can be configured to generate a probability-based retrieved representations view comprising a visualization of representations of multiple log sets identified as related to a representation of a given additional log set. Such a visualization illustratively includes multiple distinct icons or other links that when actuated allow the user to retrieve the respective actual log sets corresponding to the identified representations. A wide variety of additional or alternative view generators 136 can be used in the visualization module 128 in other embodiments.

In some embodiments, the visualization module 128 is part of a service issue analysis and visualization tool. Such a tool can incorporate other parts of the machine learning system 104. For example, it is possible to implement the machine learning system 104 within an analysis and visualization tool. The analysis and visualization tool can include a web-based user interface as its front end. An analytics database and associated processing logic can form a backend of the tool.

Although the visualization module 128 in the FIG. 1 embodiment is shown as being implemented within the machine learning system 104, in other embodiments this component, like the log set preprocessor 120 as previously indicated, can be implemented at least in part externally to the machine learning system 104, such as in the service issue tracking system 116 associated with the log sets database 114, or elsewhere in the system 100.

An output display generated by visualization module 128 utilizing the one or more view generators 136 is illustratively presented on a display screen of one or more of the investigator terminals 102 of system 100. As indicated previously, such a terminal may comprise a computer, mobile telephone or other type of processing device adapted for communication with the machine learning system 104 over the network 106.

The visualization module 128 in some embodiments operates in cooperation with the probability-based log set retrieval module 124 to support tuning functionality in the machine learning system 104 using the above-noted user interface displays. However, such tuning functionality need not be provided in other embodiments. For example, some embodiments can operate utilizing unsupervised machine learning functionality.

It is to be appreciated that the particular arrangement of system components illustrated in FIG. 1 is exemplary only, and that numerous other arrangements of components may be used in other embodiments. For example, in other embodiments, probability-based log set retrieval functionality described herein as being associated with one or more of the log set preprocessor 120, knowledge base 122, probability-based log set retrieval module 124, root cause prediction module 126 and visualization module 128 may be implemented at least in part using additional or alternative components of the system 100.

The machine learning system 104, and possibly other related components of system 100 such as the log sets database 114, are assumed in the present embodiment to be implemented on a given processing platform using at least one processing device comprising a processor coupled to a memory. Examples of such processing platforms will be described in greater detail below in conjunction with FIGS. 6 and 7.

The one or more processing devices implementing the machine learning system 104, and possibly other components of system 100, may each further include a network interface that allows such components to communicate with one another over network 106. For example, a given such network interface illustratively comprises network interface circuitry that allows at least one of the modules 120, 122, 124, 126 and 128 to communicate over network 106 with other components of the system 100 such as investigator terminals 102, the log sets database 114 and service issue tracking system 116. Such network interface circuitry may comprise, for example, one or more conventional transceivers.

The network 106 may comprise, for example, a global computer network such as the Internet, a wide area network (WAN), a local area network (LAN), a satellite network, a telephone or cable network, a cellular network, a wireless network such as a WiFi network or a WiMAX network, or various portions or combinations of these and other types of networks.

As a more particular example, some embodiments may implement at least a portion of the network 106 utilizing one or more high-speed local networks in which associated processing devices communicate with one another utilizing Peripheral Component Interconnect express (PCIe) cards of those devices, and networking protocols such as Infini-Band™, Gigabit Ethernet or Fibre Channel. Numerous alternative networking arrangements are possible in a given embodiment, as will be appreciated by those skilled in the art.

At least a portion of the machine learning system 104, and possibly other system components, may comprise software that is stored in a memory and executed by a processor of at least one processing device.

Again, it should be understood that the particular sets of components implemented in the information processing system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be further described with reference to the flow diagram of FIG. 2, which illustrates an exemplary process carried out by the system 100 in one embodiment. The process as shown includes steps 200 through 212. Steps 200 through 212 are assumed to be performed by the machine learning system 104, but one or more of these steps may be performed at least in part by, or in conjunction with, other system components in other embodiments. Moreover, functionality for probability-based retrieval of service issue investigation log sets as disclosed herein should not be viewed as being limited in any way to this particular illustrative arrangement of process steps. As indicated above, probability-based retrieval of log sets is assumed to encompass probability-based retrieval of corresponding log set representations from the knowledge base 122, as well as numerous other probability-based retrieval arrangements.

In step 200, features are extracted from each of a plurality of service issue investigation log sets, as discussed further below in conjunction with FIG. 3. For example, the service issue investigation log sets are illustratively obtained by the machine learning system 104 accessing the log sets database 114. The feature extractor 130 of the log set preprocessor 120 is then utilized to extract features from each of the obtained service issue investigation log sets. It is to be appreciated, however, that numerous other techniques may be used to obtain service issue investigation log sets for feature extraction in other embodiments. For example, the machine learning system 104 can obtain at least a portion of the service issue investigation log sets directly from the service issue tracking system 116 as those log sets are generated within system 100.

In step 202, representations are generated for respective ones of the service issue investigation log sets based at least in part on the corresponding extracted features, as discussed further below in conjunction with FIG. 3. This operation is illustratively performed by the representation generator 132 of the log set preprocessor 120. The representations in some embodiments are generated as respective vector representations having entries corresponding to respective ones of the extracted features. Additionally or alternatively, one or more of the representations is augmented utilizing metadata obtained from the service issue tracking system 116. Such metadata may comprise root cause information or other types of information characterizing at least portions of the corresponding service issue investigation log set. As indicated previously, numerous other types and formats are possible for log set representations in illustrative embodiments.

Multiple service issue investigation log sets can be processed as a batch in steps 200 and 202. Alternatively, different instances of steps 200 and 202 can be applied serially to each of a plurality of such log sets. Accordingly, illustrative embodiments can support batch or serial processing modes, as well as other types of processing modes for handling multiple service issue investigation log sets. One or more of the service issue investigation log sets processed in steps 200 and 202 may comprise training log sets selected as being representative of at least a portion of a history of service issues for a particular customer, for example, as reflected by the service issue tracking system 116. In other implementations of the process, the process can be initiated using only a single service issue investigation log set, rather than multiple service issue investigation log sets as illustrated in the present embodiment.

In step 204, the generated representations are stored in a knowledge base. For example, the representations may be stored in knowledge base 122 as they are generated by the representation generator 132. The knowledge base 122 is illustratively a database accessible to the machine learning system 104. For example, in some embodiments, the knowledge base 122 is implemented as a MongoDB database. The term "knowledge base" as used herein is intended to be broadly construed so as to encompass one or more databases or other storage arrangements comprising multiple representations each derived from at least a portion of one or more service issue investigation log sets.

In step 206, the machine learning system 104 is trained using at least a subset of representations of the service issue investigation log sets in the knowledge base 122. At least some of the representations of the service issue investigation log sets used for training comprise an indication of one or more related service issues. The machine learning system 104 learns to identify related pairs of the service issue investigation log sets.

In step 208, an additional service issue investigation log set is obtained and a representation of the additional log set is generated. One or more of the representations stored in the knowledge base 122 that exhibit at least a specified relationship with the representation of the additional log set are then identified using the trained machine learning system 104, as discussed further below in conjunction with FIG. 4.

In step 210, information characterizing the log sets corresponding to the identified representations is presented in a user interface, as discussed further below in conjunction with FIG. 5. For example, the identified representations or related information characterizing those representations can be presented in a sorted order of degree of relationship with the additional log set (e.g., a Top N list).

Some embodiments can perform one or more additional or alternative processing operations in conjunction with identification of representations of relationships with the additional representation. For example, a root cause may be estimated or otherwise determined for the at least one additional service issue investigation log set based at least in part on root cause information associated with respective ones of the one or more of the representations previously stored in the knowledge base 122 that exhibit at least the specified relationship with the representation of the additional service issue investigation log set. Such a root cause determination may be presented in the user interface in association with the information characterizing the log sets corresponding to the identified representations.

In step 212, the representation of the additional log set is stored in knowledge base 122 and program control returns to step 208.

Figure 2:
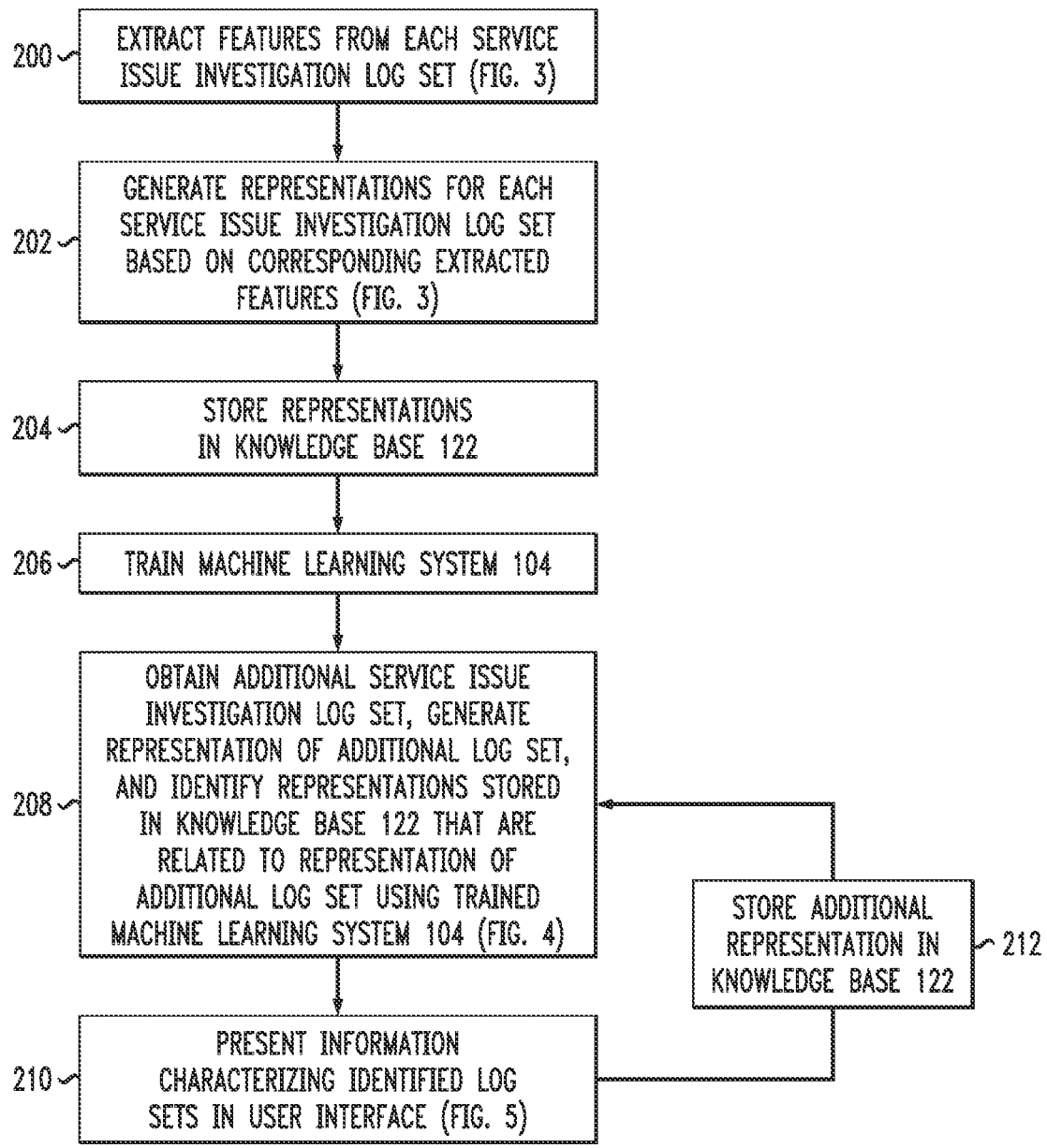
FIG. 2 is a flow chart illustrating an exemplary implementation of a machine learning-based recommendation process for root cause analysis of service issues, according to one embodiment of the invention.

Although the FIG. 2 process is illustrated for the case of processing a single additional service issue investigation log set in steps 208, 210 and 212, these steps can be applied substantially simultaneously to multiple additional service issue investigation log sets.

Figure 3:
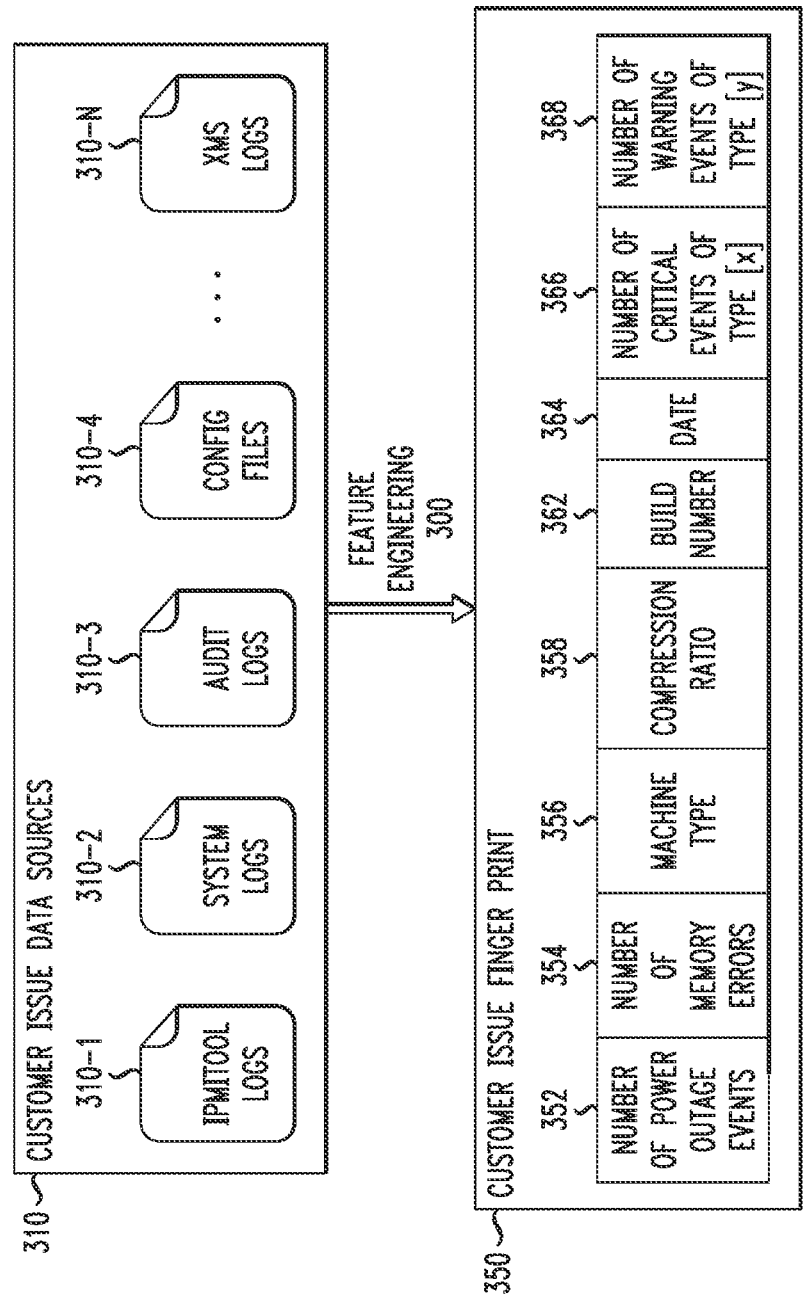
FIG. 3 illustrates an exemplary technique that may be employed by the log set preprocessor of FIG. 1 to extract features from a number of sources for customer service issues, according to one embodiment of the invention.

FIG. 3 illustrates an exemplary technique that may be employed by the log set preprocessor of FIG. 1 to extract features from a number of sources for customer service issues, according to one embodiment of the invention. As shown in FIG. 3, an exemplary feature engineering process 300 is applied to a number of customer issue data sources 310, such as various logs and files 310-1 through 310-N comprising records of services issues. The exemplary feature engineering process 300 generates a customer issue finger print 350 for each service issue comprising a plurality of features 352-368. For example, the extracted features may comprise a number of power outage events 352, a number of memory errors 354, a machine type 356, a compression ratio 358, a build number 362, a date of occurrence 364, a number of critical events of a given type 366, and a number of warning events of a given type 368.

In this manner, the exemplary knowledge base 122 (FIG. 1) comprises a set of finger prints 350 of past issues. The finger prints 350 of past issues can be implemented, for example, as vector representations that can be digested by the machine learning system 104.

The exemplary feature engineering process 300 can be implemented, for example, as a Python script. For example, the script can read the relevant information from the data sources 310, transform the issue into the finger print vector representation 350 and load the finger print 350 as a serialized file into the knowledge base 122 that can be later read by the machine learning system 104.

Some issues originate from multiple data sources 310, where each source 310 can have thousands and even millions of log events. Putting together all of the relevant events into a coherent root cause analysis can be a tedious task that cannot be always achieved by a human being. The disclosed techniques enable a scalable investigation with the transformation of data sources 310 of an issue into a finger print vector representation 350 of the service issue. The finger print 350 is later used by the machine learning system 104 that automatically retrieves prior service issues that are sufficiently related to the new issue.

In this manner, user bias is reduced by taking into account only the content of the data sources 310 when analyzing a new issue. In the common approach, investigations are mainly driven by manual annotations, Jira™ labels, query phrases, etc. The disclosed solution prioritizes data source content over user perspectives when characterizing a new issue.

Figure 4:
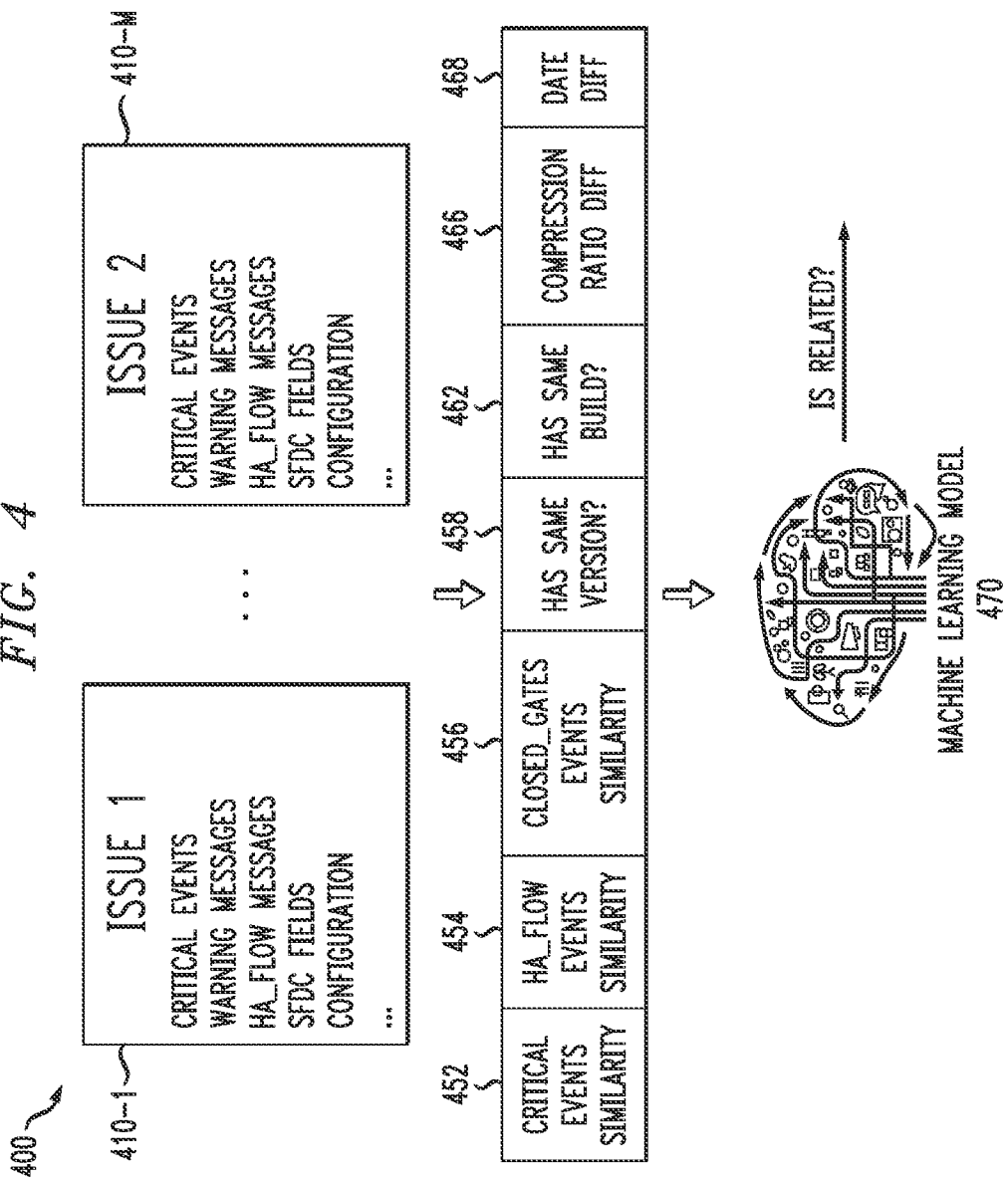
FIG. 4 illustrates an exemplary technique that may be employed by the process of FIG. 2 to determine whether two service issues are related to each other, according to one embodiment of the invention.

FIG. 4 illustrates an exemplary technique that may be employed by the process of FIG. 2 to determine whether two service issues, such as Issue 1 (410-1) and Issue 2 (410-2), are related to each other, according to one embodiment of the invention. As shown in FIG. 4, given finger print representations 350 of two service issues, a machine learning model 470 is trained to determine the probability that two issues are related to each other. The model training can be done in a supervised manner in cases where past relations are retrievable from a tracking system (e.g., Jira™), or in unsupervised manner by using similarities algorithms.

In the case of a supervised machine learning model, for example, the machine learning model aims at classifying whether two finger prints 350 are related in terms of root cause analysis. For example, if a given customer issue, x, used information of a prior service issue, y, then the pair vector [y_to_x] will be classified as related. In one exemplary implementation, relations are retrieved from a Jira™

"root cause analysis" field that may contain links to related issue. The pair vector [y_to_x] is composed of different similarity measures, such as versions distance, critical_events_cosine_similarity, audit_logs_distribution similarity, and is_same_machine?. The goal of the machine learning model is to determine whether a given pair vector is likely to be related. A Random Forest classifier can be employed as the chosen model.

As shown in FIG. 4, the exemplary issues 410 comprise the following features: Critical Events; Warning Messages; HA_FLOW messages; and SFDC (Sales Force Dot Com) Fields. The machine learning model 470 then considers whether the two issues 410 are related based on whether the two issues 410 exhibit critical events similarity 452; HA_flow events similarity 454; Closed_gates events similarity 456; have a same version 458; have a same build 462; a predefined Compression ratio difference 466; and a predefined date difference 468.

FIG. 5 illustrates an exemplary user interface 500 for presenting a top N list of related service issues, according to one embodiment of the disclosure. In the exemplary embodiment of FIG. 5, root cause directions are communicated to the user as a list of top N related issues, as determined by the machine learning system 104. The size of the list [N] depends on user preferences. The list of recommendations is presented on top of a user interface that may include different features such as links to recommended issues tickets, alike report of issues of similar aspects, and a feedback option (e.g., like or dislike).

In the embodiment of FIG. 5, the top N (N=5) service issues are identified using an issue number identifier. For each related issue, the exemplary user interface 500 provides the distance score with respect to the new issue, a build string, a summary of the related issue (e.g., a textual description of the related issue) and a feedback option. The exemplary user interface 500 can optionally provide a link to the Jira™ ticket for each related issue.

The above-noted user interface 500 is illustratively configured to permit a user to provide feedback regarding the one or more identified representations. For example, in some embodiments, the machine learning system 104 is further configured to receive user feedback regarding at least one of the identified one or more representations via the user interface and to adjust the machine learning system 104 responsive to the received user feedback. A user interface configured to receive user feedback of this type is also referred to herein as a tuning interface. The user feedback can include a confidence level for each of the one or more identified representations with the confidence level for a given one of the identified representations indicating how related the user believes the given identified representation is to a submitted additional service issue investigation log set. These and other types of feedback provided via a user interface are illustratively provided by one or more developers, analysts, subject matter experts or other system users.

The machine learning system 104 in some embodiments utilizes such feedback to update the machine learning system 104 for automated classification of service issue investigation log set representations in conjunction with probability-based retrieval. A relatively small amount of such feedback can lead to significant enhancements in the accuracy and efficiency of the automated classification process. Illustrative embodiments can thus facilitate unsupervised classification with minimal analyst intervention via the user interface to achieve significantly higher levels of performance.

Various types of user interfaces comprising functionality for provision of user feedback can be configured under the control of the view generators 136 of the visualization module 128 of the machine learning system 104. For example, one possible user interface can present links to the one or more service issue investigation log sets corresponding to the respective one or more identified representations. Actuation of a given such link causes additional information relating to the selected service issue investigation log set to be retrieved and presented via the user interface. A control button or other selection mechanism can be provided to allow the user to provide a confidence level or other type of feedback for each of the identified representations or their respective corresponding log sets. For example, the confidence level in some embodiments is binary in that the user can select only "related" or "not related" although other arrangements of multiple selectable confidence levels can be used in other embodiments.

Numerous other types of user interfaces can be used in other embodiments. Such user interfaces are assumed to utilize one or more visualizations generated by view generators 136 of the visualization module 128. Such visualizations can include graphs or other displays, as well as drop-down menus, activatable icons or other control buttons configured to facilitate user navigation through the identified one or more representations or the corresponding service issue investigation log sets.

Steps 200 through 212 of the FIG. 2 process can be repeated periodically or as needed to process additional service issue investigation log sets. The process illustratively provides a user with an accurate and efficient automated mechanism for identifying and accessing service issue investigation log sets that are sufficiently related to a given additional service issue investigation log set possibly submitted by the user.

The particular processing operations and other system functionality described in conjunction with FIGS. 2 through 5 are presented by way of illustrative example only, and should not be construed as limiting the scope of the disclosure in any way. Alternative embodiments can use other types of processing operations for implementing probability-based retrieval of service issue investigation log sets in a machine learning system. For example, the ordering of the process steps may be varied in other embodiments, or certain steps may be performed concurrently with one another rather than serially.

It is to be appreciated that functionality such as that described in conjunction with the flow diagram of FIG. 2 can be implemented at least in part in the form of one or more software programs stored in memory and executed by a processor of a processing device such as a computer or a virtual machine. As mentioned previously, a memory or other storage device having such program code embodied therein is an example of what is more generally referred to herein as a "processor-readable storage medium."

In addition, as noted above, the configuration of information processing system 100 is exemplary only, and numerous other system configurations can be used in implementing a machine learning system as disclosed herein.

The illustrative embodiments provide a number of significant advantages relative to conventional arrangements.

For example, one or more of these embodiments avoid the need for inefficient and subjective manual processing of service issue investigation log sets by service investigators. Instead, the machine learning systems in some embodiments are data driven in that relations between distinct service issue investigation log sets are identified automatically from the actual log set data itself, illustratively utilizing behavioral patterns reflected in extracted features. Such arrangements facilitate investigation of issues arising in conjunction with deployment of new or upgraded software, leading to accelerated service issue and associated reductions in cost and complexity.

Some embodiments provide a proactive approach that builds a data-driven knowledge base of log set representations so as to facilitate automated issue detection and resolution in conjunction with service issues. Such an approach significantly shortens the service issue investigation process as it automatically identifies existing related issues. For example, a given embodiment can receive a particular log set as its input and can return a list of existing issues that share sufficiently related log characteristics.

In addition, different investigators may have different semantic interpretations for the same or very similar customer issue. For example, assume that a first user titles a customer issue as "data unavailability," while a second user subsequently encounters the same or very similar issue, but views the problem as a "power outage." With the existing tracking systems, the textual conclusions of the first user will not benefit the second user at all.

Experienced support engineers have many advantages, such as being able to quickly identify a root cause of a familiar issue and knowing the most probable "hot spot" in many customer issues. However, experience can be an obstacle when encountering unique or unfamiliar issues, for which their root cause can be derived only from rare log messages and overlooked data sources.

One or more of the illustrative embodiments not only result in reduced service issue investigation time, but also avoid subjectively biased investigations while providing more reliable service issue tracking based on highly accurate representations reflecting the actual state of the service issues as investigated in the field.

These and other embodiments can avoid situations in which, for example, different service investigators utilize different terminology or naming conventions to describe related issues. Also, problems arising from poor data quality such as misspellings or ambiguities in the log sets are avoided by the probability-based retrieval functionality implemented in illustrative embodiments herein. Moreover, there is no need to formulate a query in the particular language of a given service issue tracking system, such as the JQL query language required by the JIRA™ service issue tracking system.

In one or more embodiments, a machine learning-based recommendation tool is provided that leverages data mining, information retrieval and machine learning approaches, to recommend similar past issues (e.g., past issues that are likely to be related) to consider for a new customer issue. In this manner, the investigation time for new customer issues can be reduced from, for example, several hours to several minutes.

In at least one embodiment, given a new customer issue, the disclosed machine learning-based recommendation tool recommends one or more previously considered issues that are likely to be related to the new customer issue. Generally, the exemplary machine learning-based recommendation tool provides root cause analysis directions for customer issues that are under investigation by investigators, such as customer support engineers. In one exemplary embodiment, the machine learning-based recommendation tool is implemented as a content-based recommender system that, given a new customer issue, recommends past issues that are likely to be related to the current issue under investigation. Recommendations are made by retrieving one or more candidate issues from a designated knowledge base. Using machine learning algorithms, the disclosed machine learning-based recommendation tool recommends previously considered issues that are most relevant to the incoming issue in terms of root cause analysis investigation. The final candidate issues are optionally presented to the user in a search-engine like user interface (UI).

It is to be appreciated that the foregoing advantages are illustrative of advantages provided in certain embodiments, and need not be present in other embodiments.

In these and other embodiments, compute services can be offered to cloud infrastructure tenants or other system users as a PaaS offering, although numerous alternative arrangements are possible.

Illustrative embodiments disclosed herein can provide a number of significant advantages relative to conventional arrangements. For example, one or more embodiments provide significantly improved probability-based retrieval of related service issues.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as machine learning system 104, or portions thereof, are illustratively implemented for use by tenants of such a multi-tenant environment.

As mentioned previously, cloud infrastructure as disclosed herein can include cloud-based systems such as AWS™, GCP™ and Microsoft Azure®. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
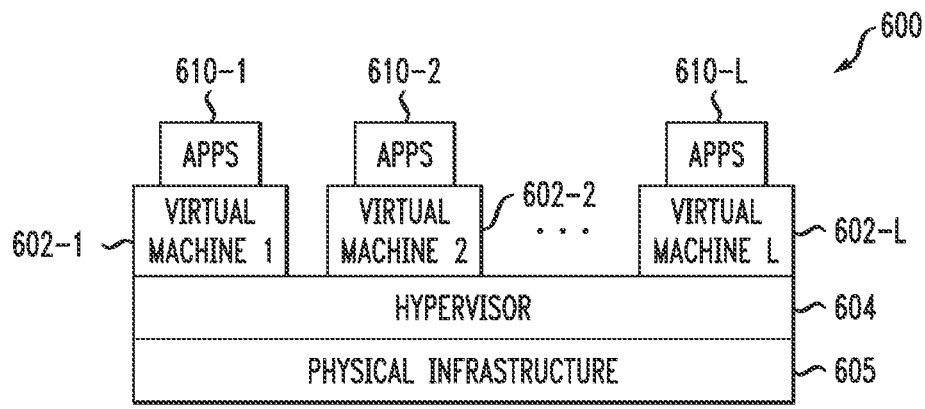
FIGS. 6 and 7 show examples of processing platforms that may be utilized to implement at least a portion of the information processing system of FIG. 1.
Figure 7:
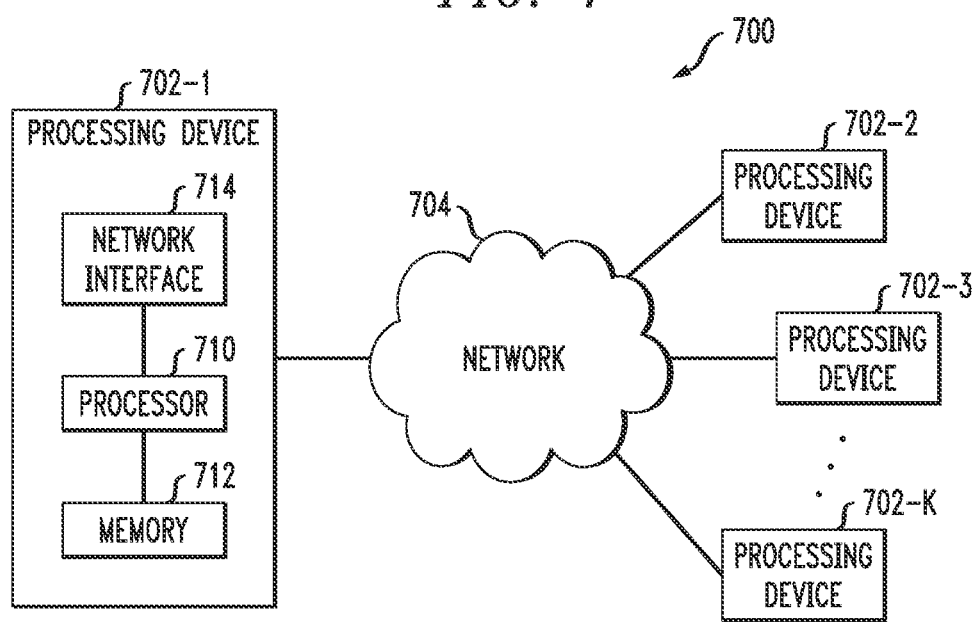

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises virtual machines (VMs) 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

Although only a single hypervisor 604 is shown in the embodiment of FIG. 6, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 604 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of machine learning system 104 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, compute services platforms, time series generation devices and time series data servers. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    extracting features from each of a plurality of service issue investigation log sets corresponding to previously considered service issues;
    generating vector representations for respective ones of the service issue investigation log sets based at least in part on the corresponding extracted features, wherein each of the vector representations comprises values corresponding to respective ones of the extracted features for the corresponding service issue investigation log set;
    storing the vector representations in a knowledge base;
    augmenting the vector representation of a given one of the service issue investigation log sets with root cause information;
    performing a supervised learning process to train a machine learning-based recommendation tool based at least in part on the vector representations, including at least one of the augmented vector representations, stored in the knowledge base; and
    in conjunction with obtaining at least one additional service issue investigation log set requiring investigation to determine one or more root causes of the corresponding at least one additional service issue, performing the following steps:
    generating a vector representation of the at least one additional service issue investigation log set;
    identifying, using at least one processing device of the machine learning-based recommendation tool, one or more vector representations from among the vector representations, including at least one of the augmented vector representations, previously stored in the knowledge base as candidate service issues that are related to the at least one additional service issue, wherein the machine learning-based recommendation tool processes the generated vector representation of the additional service issue investigation log set and the identified one or more vector representations to generate pairwise probabilities indicating whether said at least one additional service issue is related to at least a subset of said previously considered service issues; and
    presenting information characterizing the one or more service issue investigation log sets corresponding to respective ones of the identified one or more vector representations in a user interface.

2. The method of claim 1, wherein said machine learning-based recommendation tool is trained to learn when individual pairs of at least a plurality of said previously considered service issues are related to each other.

3. The method of claim 1, further comprising:
    filtering said vector representations in said knowledge base based on one or more features of said vector representations.

4. The method of claim 1, further comprising:
    determining a root cause for the at least one additional service issue based at least in part on root cause information associated with respective ones of the one or more of the vector representations previously stored in the knowledge base that satisfy a predefined criteria for being related to the at least one additional service issue.

5. The method of claim 1, the vector representation of a given one of the service issue investigation log sets comprises entries corresponding to respective ones of the extracted features.

6. The method of claim 1, wherein the information characterizing the one or more service issue investigation log sets comprises a top N list of the identified one or more vector representations based on said pairwise probabilities.

7. The method of claim 1, further comprising:
    obtaining feedback from a user via the user interface, the feedback comprising at least one confidence level for at least one of the one or more service issue investigation log sets; and
    updating the machine learning-based recommendation tool based on said feedback.

8. The method of claim 1, wherein a given one of the service issue investigation log sets comprises a plurality of log files relating to a plurality of different events from at least two different nodes of a cluster-based system in which the corresponding service issue occurred.

9. A computer program product, comprising a tangible machine-readable storage medium having encoded therein executable code of one or more software programs, wherein the one or more software programs when executed by at least one processing device perform the following steps:
    extracting features from each of a plurality of service issue investigation log sets corresponding to previously considered service issues;
    generating vector representations for respective ones of the service issue investigation log sets based at least in part on the corresponding extracted features, wherein each of the vector representations comprises values corresponding to respective ones of the extracted features for the corresponding service issue investigation log set;
    storing the vector representations in a knowledge base;
    augmenting the vector representation of a given one of the service issue investigation log sets with root cause information;
    performing a supervised learning process to train a machine learning-based recommendation tool based at least in part on the vector representations, including at least one of the augmented vector representations, stored in the knowledge base; and in conjunction with obtaining at least one additional service issue investigation log set requiring investigation to determine one or more root causes of the corresponding at least one additional service issue, performing the following steps:

generating a vector representation of the at least one additional service issue investigation log set;

identifying, using at least one processing device of the machine learning-based recommendation tool, one or more vector representations from among the vector representations, including at least one of the augmented vector representations, previously stored in the knowledge base as candidate service issues that are related to the at least one additional service issue, wherein the machine learning-based recommendation tool processes the generated vector representation of the additional service issue investigation log set and the identified one or more vector representations to generate pairwise probabilities indicating whether said at least one additional service issue is related to at least a subset of said previously considered service issues; and presenting information characterizing the one or more service issue investigation log sets corresponding to respective ones of the identified one or more vector representations in a user interface.

10. The computer program product of claim 9, wherein said machine learning-based recommendation tool is trained to learn when individual pairs of at least a plurality of said previously considered service issues are related to each other.

11. The computer program product of claim 9, wherein the one or more software programs when executed by the at least one processing device further perform:

determining a root cause for the at least one additional service issue based at least in part on root cause information associated with respective ones of the one or more of the vector representations previously stored in the knowledge base that satisfy a predefined criteria for being related to the at least one additional service issue.

12. The computer program product of claim 9, wherein the one or more software programs when executed by the at least one processing device further perform:

obtaining feedback from a user via the user interface, the feedback comprising at least one confidence level for at least one of the one or more service issue investigation log sets; and updating the machine learning-based recommendation tool based on said feedback.

13. The computer program product of claim 9, wherein a given one of the service issue investigation log sets comprises a plurality of log files relating to a plurality of different events from at least two different nodes of a cluster-based system in which the corresponding service issue occurred.

14. An apparatus, comprising:

at least one processing device comprising a processor coupled to a memory;

the at least one processing device being configured:

to extract features from each of a plurality of service issue investigation log sets corresponding to previously considered service issues;

to generate vector representations for respective ones of the service issue investigation log sets based at least in part on the corresponding extracted features, wherein each of the vector representations comprises values corresponding to respective ones of the extracted features for the corresponding service issue investigation log set;

to store the vector representations in a knowledge base;

to augment the vector representation of a given one of the service issue investigation log sets with root cause information;

to perform a supervised learning process to train a machine learning-based recommendation tool based at least in part on the vector representations, including at least one of the augmented vector representations, stored in the knowledge base; and in conjunction with obtaining at least one additional service issue investigation log set requiring investigation to determine one or more root causes of the corresponding at least one additional service issue, to perform the following steps:

to generate a vector representation of the at least one additional service issue investigation log set;

to identify, using the machine learning-based recommendation tool, one or more vector representations from among the vector representations, including at least one of the augmented vector representations, previously stored in the knowledge base as candidate service issues that are related to the at least one additional service issue, wherein the machine learning-based recommendation tool processes the generated vector representation of the additional service issue investigation log set and the identified one or more vector representations to generate pairwise probabilities indicating whether said at least one additional service issue is related to at least a subset of said previously considered service issues; and to present information characterizing the one or more service issue investigation log sets corresponding to respective ones of the identified one or more vector representations in a user interface.

15. The apparatus of claim 14, wherein said machine learning-based recommendation tool is trained to learn when individual pairs of at least a plurality of said previously considered service issues are related to each other.

16. The apparatus of claim 14, wherein the at least one processing device is further configured to filter said vector representations in said knowledge base based on one or more features of said vector representations.

17. The apparatus of claim 14, wherein the at least one processing device is further configured to determine a root cause for the at least one additional service issue based at least in part on root cause information associated with respective ones of the one or more of the vector representations previously stored in the knowledge base that satisfy a predefined criteria for being related to the at least one additional service issue.

18. The apparatus of claim 14, wherein the vector representation comprises entries corresponding to respective ones of the extracted features.

19. The apparatus of claim 14, wherein the information characterizing the one or more service issue investigation log sets comprises a top N list of the identified one or more vector representations based on said pairwise probabilities.

20. The apparatus of claim 14, wherein the at least one processing device is further configured:

to obtain feedback from a user via the user interface, the feedback comprising at least one confidence level for at least one of the one or more service issue investigation log sets; and to update the machine learning-based recommendation tool based on said feedback.

* * * * *